(12) United States Patent
Uchiyama

(10) Patent No.: US 9,153,155 B2
(45) Date of Patent: Oct. 6, 2015

(54) DISPLAY APPARATUS AND METHOD FOR DISPLAYING HIGH RESOLUTION IMAGES BASED ON INSTALLATION LOCATION

(71) Applicant: JVC KENWOOD Corporation, Yokohama-shi, Kanagawa (JP)

(72) Inventor: Yuji Uchiyama, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 280 days.

(21) Appl. No.: 14/014,613

(22) Filed: Aug. 30, 2013

(65) Prior Publication Data

US 2014/0078147 A1    Mar. 20, 2014

(30) Foreign Application Priority Data

Sep. 19, 2012 (JP) ................. 2012-205731

(51) Int. Cl.
*G09G 3/00* (2006.01)
*G09G 5/391* (2006.01)
*H04N 5/74* (2006.01)
*H04N 9/31* (2006.01)

(52) U.S. Cl.
CPC ................ *G09G 3/007* (2013.01); *G09G 3/001* (2013.01); *H04N 5/74* (2013.01); *G09G 5/391* (2013.01); *G09G 2340/0457* (2013.01); *G09G 2340/0492* (2013.01); *H04N 9/3188* (2013.01)

(58) Field of Classification Search
None
See application file for complete search history.

(56) References Cited

U.S. PATENT DOCUMENTS

| | | | | |
|---|---|---|---|---|
| 4,366,508 A | * | 12/1982 | Crean et al. .................... | 358/451 |
| 5,422,658 A | * | 6/1995 | Kawaguchi et al. ........... | 345/213 |
| 5,537,256 A | * | 7/1996 | Fergason ................. | 359/484.06 |
| 5,689,283 A | * | 11/1997 | Shirochi ........................ | 345/698 |
| 6,657,603 B1 | * | 12/2003 | Demetrescu et al. ........... | 345/32 |
| 2003/0132901 A1 | * | 7/2003 | Shimada ......................... | 345/87 |
| 2004/0196253 A1 | * | 10/2004 | Eichenlaub .................... | 345/102 |
| 2007/0268541 A1 | * | 11/2007 | Fujita et al. .................... | 359/201 |
| 2012/0098853 A1 | * | 4/2012 | Kobayashi et al. ............ | 345/593 |
| 2013/0242210 A1 | * | 9/2013 | Endo et al. ......................... | 349/8 |

FOREIGN PATENT DOCUMENTS

JP    2008040355 A    2/2008

* cited by examiner

*Primary Examiner* — Carlos Perromat
(74) *Attorney, Agent, or Firm* — Nath, Goldberg & Meyer; Jerald L. Meyer; Stanley N. Protigal

(57) ABSTRACT

An image signal source alternately outputs two types of image signal. A pixel shifting unit outputs an image as light displayed by a display element having a number of pixels corresponding to the image signal while alternately shifting the light by a distance of a ½ pixel horizontally and a ½ pixel vertically. A horizontal display control unit receives the image signal and, in response to an installation position, changes the received image signal so that an image corresponding to any one of the two types of image signal alternately outputted is horizontally shifted by one pixel. A display element drive unit receives the changed image signal and, in response to the installation position, controls the display element so that the display element displays an image obtained by horizontally inverting the image based on the received image signal.

6 Claims, 16 Drawing Sheets

FIG. 12
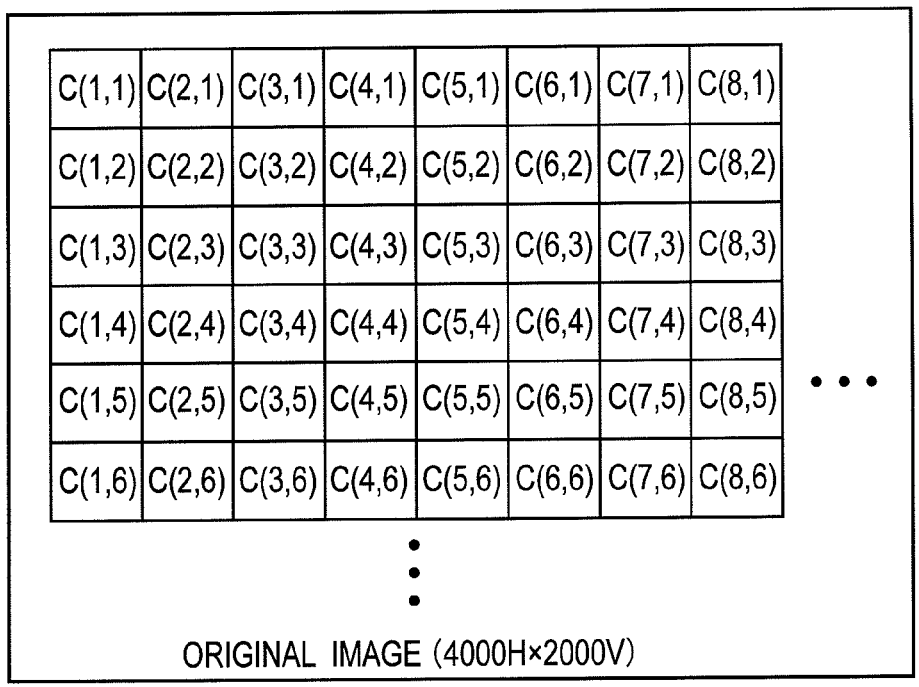
ORIGINAL IMAGE (4000H×2000V)
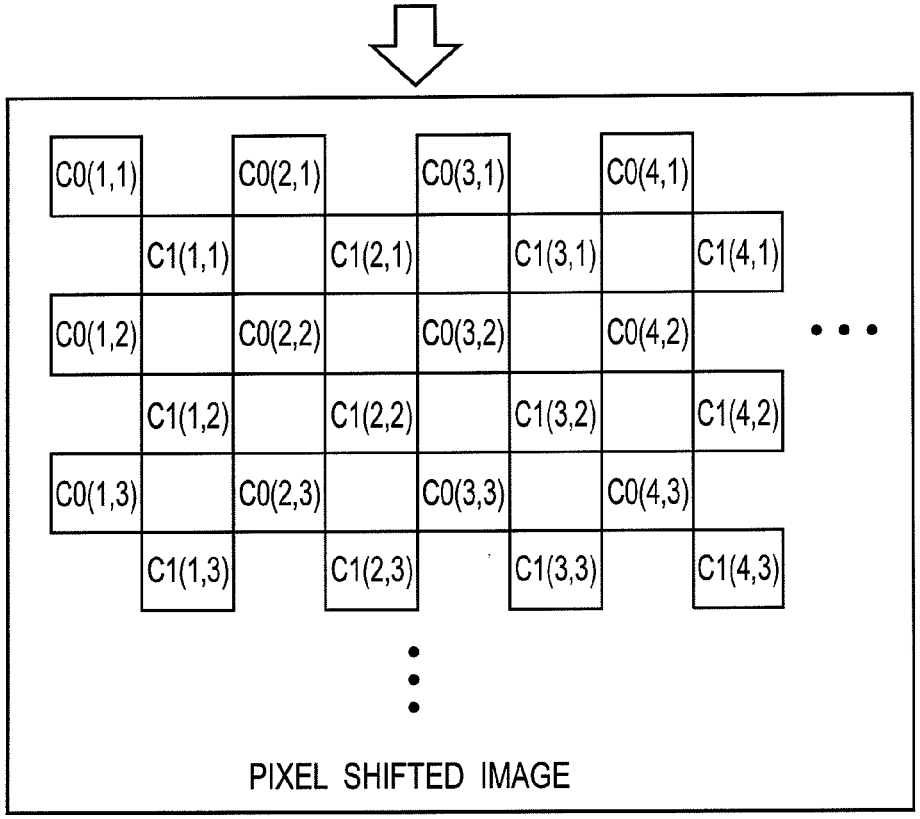
PIXEL SHIFTED IMAGE

DISPLAY APPARATUS AND METHOD FOR DISPLAYING HIGH RESOLUTION IMAGES BASED ON INSTALLATION LOCATION

CROSS REFERENCE TO RELATED APPLICATION

This application is based on prior Japanese Patent Application No. 2012-205731 (filed on Sep. 19, 2012 in Japan). The entire contents of the Japanese Patent Application No. 2012-205731 from which priority is claimed are incorporated herein by reference, in order to take some protection against translation errors or omitted portions.

BACKGROUND

The present invention relates to a display apparatus and a display method for displaying high resolution images by pixel shifting.

Some projection-type display apparatuses, which project an image displayed on a display element onto a screen through a projection lens and the like, change the displayed image based on the installation position of the display apparatus so as to show images which can be correctly seen by observers located in front of the screen even if the installation position thereof is changed. For example, when such a display apparatus is a front projection-type apparatus that normally projects an image from in front of the screen, the display apparatus can also project an image from the back of the screen like a rear projection-type apparatus or can be used upside down like a hanging type apparatus. In the case of rear projection or hanging projection, the display element inverts the image vertically or horizontally according to a control signal so that the image can be correctly projected onto the screen. The image is inverted vertically or horizontally by inverting the order of pixels in which the display element itself writes image information or writing image information which is vertically or horizontally inverted using a storage element such as a frame memory into which the individual pixels of the display element are written.

Generally, using small display elements can downsize the display apparatuses and reduce the cost but this limits the number of display pixels. As a countermeasure for this problem, a so-called pixel shifting technique is proposed. The pixel shifting technique increases the number of effective display pixels by projecting an image while shifting the pixels of the projected image frame by frame. Herein, the frames constitute the image. For example, a display apparatus performing pixel shifting generates image signals C0 and C1 respectively corresponding to odd frames and even frames from an original high-resolution image signal C(x, y) based on the number of pixels of the display element. The display element of the display apparatus alternately displays the image signals C0 and C1 frame by frame. Then, the pixels of the displayed image are shifted and projected using a birefringence device or the like. The display apparatus can therefore display an image composed of an equivalent number of pixels to the original image, which is larger than the number of pixels of the display element.

In such a system, when rear projection is performed using a front projection display apparatus that normally shifts the pixels of C1 to the lower right with respect to the corresponding pixels of C0, the pixels of C1 instead need to be shifted to the lower left with respect to the corresponding pixels of C0. In this case, the display apparatus cannot project a correct image only by horizontally inverting the image using the display element. In a similar manner, in the case of hanging front projection or hanging rear projection, the display apparatus cannot project correct images. These problems can be solved by rotating the birefringence element. However, this requires the display apparatus to include a rotation mechanism which could increase the size and manufacturing cost thereof. Accordingly, a display apparatus is proposed which includes a frame memory between the image signal source and the display element which properly maps an image based on the installation position (see Japanese Patent Laid-open Publication No. 2008-40355).

SUMMARY

The technique described in Japanese Patent Laid-open Publication No. 2008-40355 requires additional circuit elements to properly map an image based on the installation position of the display apparatus which could increase the size of the display apparatus. Moreover, using expensive frame memory could increase the manufacturing cost.

In the light of the aforementioned problems, an object of the present invention is to provide a display apparatus and a display method using a simple structure which correctly displays images independently of the installation position of the display apparatus.

To achieve the aforementioned object, a first aspect of the present invention is a display apparatus, including: an image signal source alternately outputting two types of image signal on a predetermined frame-by-frame basis; a display element including a number of pixels corresponding to the image signal outputted from the image signal source; a control setting unit outputting a horizontal control signal according to an installation position of the display apparatus; a pixel shifting unit outputting an image as light displayed by the display element while shifting the light by a distance of a ½ pixel horizontally and a ½ pixel vertically on the predetermined frame-by-frame basis; a horizontal display control unit receiving the image signal outputted from the image signal source and, in response to the horizontal control signal outputted from the control setting unit, changing the received image signal to shift horizontally by one pixel, an image corresponding to any one of the two types of image signal alternately outputted on the predetermined frame-by-frame basis; and a display element drive unit receiving the image signal outputted from the horizontal display control unit and, in response to the horizontal control signal outputted from the control setting unit, controlling the display element to cause the display element to display an image obtained by horizontally inverting the image based on the received image signal.

BRIEF DESCRIPTION OF THE DRAWINGS

FIG. 12 is a schematic view for explaining the image signal used by a display apparatus performing general pixel shifting and display.

FIG. 13 is a schematic view for explaining an image horizontally inverted using a display element and projected in a display apparatus performing general pixel shifting and display.

FIG. 18 is a schematic view for explaining an image projected by the display apparatus according to the first embodiment.

FIG. 19 is a schematic view for explaining an image vertically inverted using a display element and projected in a display apparatus performing general pixel shifting and display.

FIG. 20 is a schematic view for explaining an image vertically and horizontally inverted using a display element and projected in a display apparatus performing general pixel shifting and display.

DETAILED DESCRIPTION

Figure 1:
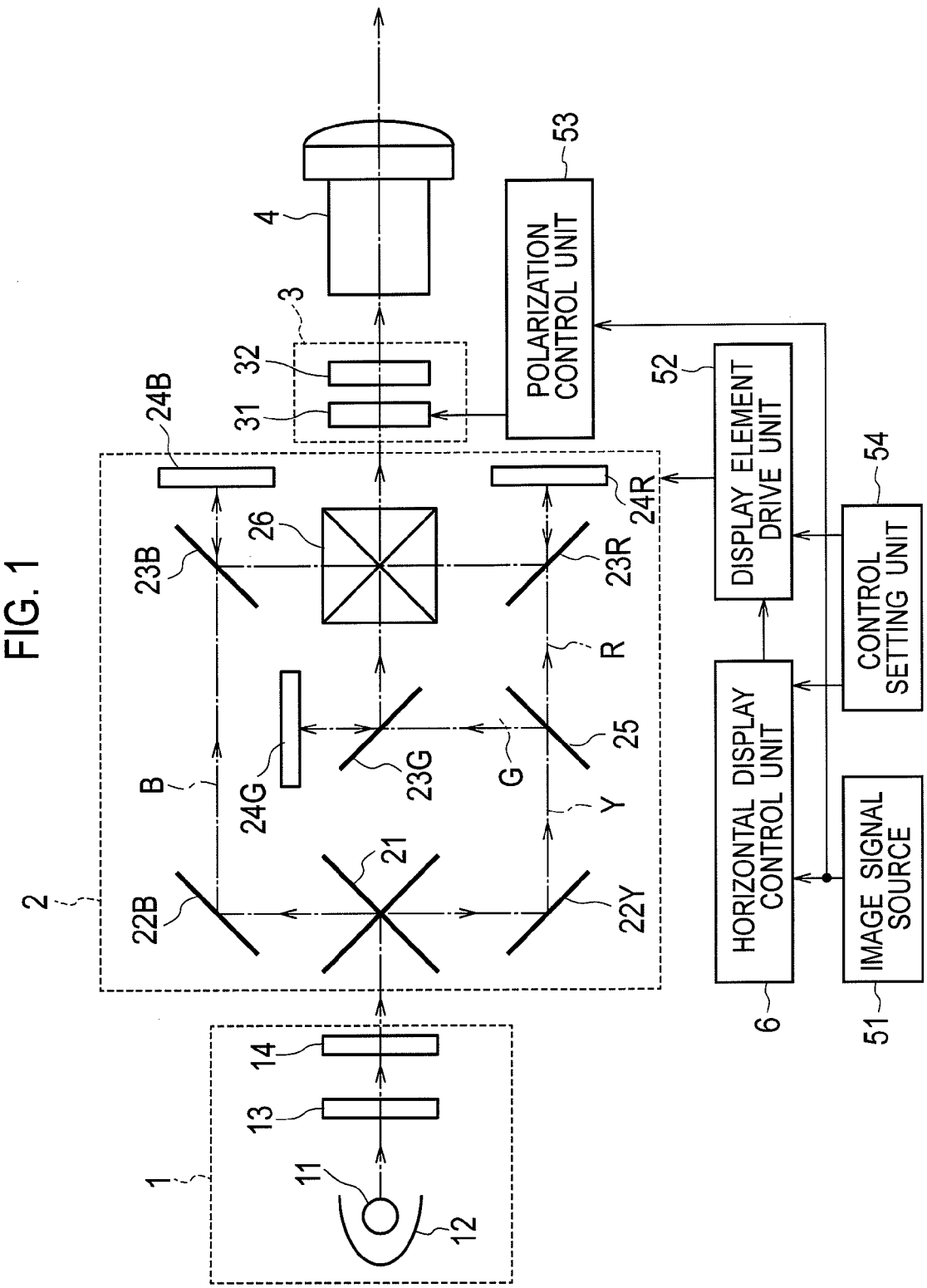
FIG. 1 is a schematic block diagram for explaining the basic structure of a display apparatus according to a first embodiment.

Next, a description is given of the first and second embodiments of the present invention with reference to the drawings. When referencing the drawings, the same or similar portions are given the same or similar reference numerals. However, the following embodiments show apparatuses for embodying the technical idea of the present invention and programs and methods used in the apparatuses, but the technical idea of the present invention is not limited to the described apparatuses and the programs and methods used in the apparatuses, which are shown in the following embodiments by way of example. The technical idea of the present invention can be variously changed within the technical scope described in the claims.

First Embodiment

As shown in FIG. 1, a display apparatus according to the first embodiment includes a light source 1 emitting light, a display optical unit 2, a pixel shifting unit 3, a projection lens 4, an image signal source 51, a display element driving unit 52, a polarization control unit 53, a control setting unit 54, and a horizontal display control unit 6.

The light source unit 1 includes a light source 11, a reflector 12, an integrator 13, and a polarizer 14. The light source 11 emits light. The reflector 12 reflects the light emitted by the light source 11. The integrator 13 homogenizes the light emitted from the light source 11 and outputs the same. The polarizer 14 adjusts polarized components of the light outputted from the integrator 13. The light source 11 is composed of a xenon lamp, an ultra high pressure mercury lamp, or the like, for example, and emits white light. The reflector 12 is composed of a concave mirror, for example, and reflects the light emitted from the light source 11 toward the integrator 13. The integrator 13 is composed of a fly-eye lens, for example, and is configured to homogenize incident light and output the homogenized light to the polarizer 14.

The display optical unit 2 includes a cross dichroic mirror 21, reflection mirrors 22B and 22Y, polarizing beam splitters (PBSs) 23R, 23G, and 23B, display elements 24R, 24G, and 24B, a dichroic mirror 25, and a cross dichroic prism 26.

The cross dichroic mirror 21 splits the light outputted from the polarizer 14 of the light source unit 1 into blue light B and yellow light Y including red light R and green light G and outputs the blue light B and yellow light Y toward the reflection mirrors 22B and 22Y, respectively. The reflection mirror 22B reflects the blue light B split by the cross dichroic mirror 21 towards the PBS 23B. The PBS 23B is composed of a wire grid polarizer, for example, and is configured to transmit s-polarized light and reflect p-polarized light. The PBS 23B transmits light coming from the reflection mirror 22B depending on the polarization state thereof and outputs the same to the display element 24B.

The display element 24B is composed of a reflective liquid crystal light bulb including a liquid crystal layer with liquid crystals sealed therein, reflecting electrodes provided for respective pixels, and the like, for example. The drive of the display element 24B is controlled by the display element drive unit 52. The reflecting electrodes of the display element 24B change voltages applied to the corresponding positions in the liquid crystal layer so as to change the orientation of liquid crystal molecules in the liquid crystal layer. The display element 24B adjusts the polarization of light coming from the PBS 23B pixel by pixel according to the image signal and reflects the light to the PBS 23B. The PBS 23B then receives the light reflected on the display element 24B and reflects the received light towards the cross dichroic prism 26 according to the polarization of light.

Similarly, the reflection mirror 22Y reflects the yellow light Y split by the cross dichroic mirror 21, towards the dichroic mirror 25. The dichroic mirror 25 splits the yellow light Y reflected on the reflection mirror 22Y into the red light R and green light G and outputs the red light R and green light G towards the PBS 23R and PBS 23G, respectively.

The PBSs 23R and 23G and the display elements 24R and 24G have substantially the same configurations as those of the PBS 23B and display element 24B, respectively, and an overlapping description thereof is omitted. The red light R, green light G, and blue light B incident on the cross dichroic prism 26 are generated by the display elements 24R, 24G, and 24B so as to include image information. Hereinafter, the display elements 24R, 24G, and 24B are collectively referred to as just a display element 24 in some cases.

The cross dichroic prism 26 refracts the light coming from the PBSs 23R and 23B toward the pixel shifting unit 3 and directly transmits the light coming from the PBS 23G to output the coming light towards the pixel shifting unit 3. The cross dichroic prism 26 combines the lights coming from the PBSs 23R, 23G, and 23B so that the pixels thereof correspond to each other and outputs the same to the pixel shifting unit 3.

The pixel shifting unit 3 includes a polarization conversion element 31 and a birefringence element 32. The polarization conversion element 31 adjusts the direction of polarization of the light coming from the cross dichroic prism 26 of the display optical unit 2 and outputs the same. The birefringence element 32 outputs the light coming from the polarization conversion element 31 in different directions depending on the direction of polarization. The pixel shifting unit 3 performs so-called pixel shifting so that pixels of the image projected by the display apparatus according to the first embodiment are alternately shifted from each other on a predetermined frame-by-frame basis (the frames are static images constituting a motion picture) in synchronization with the image signal.

The polarization conversion element 31 is composed of a liquid crystal shutter including a liquid crystal layer with liquid crystals sealed therein and a transparent electrode applying voltage to the liquid crystal layer, for example. The drive of the polarization conversion element 31 is controlled by the polarization control unit 53. The polarization conversion element 31 rotates the direction of polarization of incident light according to the voltage applied to the liquid crystal layer and outputs the same. For example, when the applied voltage is off, the polarization conversion element 31 directly transmits incident light without changing the direction of polarization thereof, and when the applied voltage is on, the polarization conversion element 31 rotates the direction of polarization of incident light by 45 degrees and outputs the same.

Figure 2:
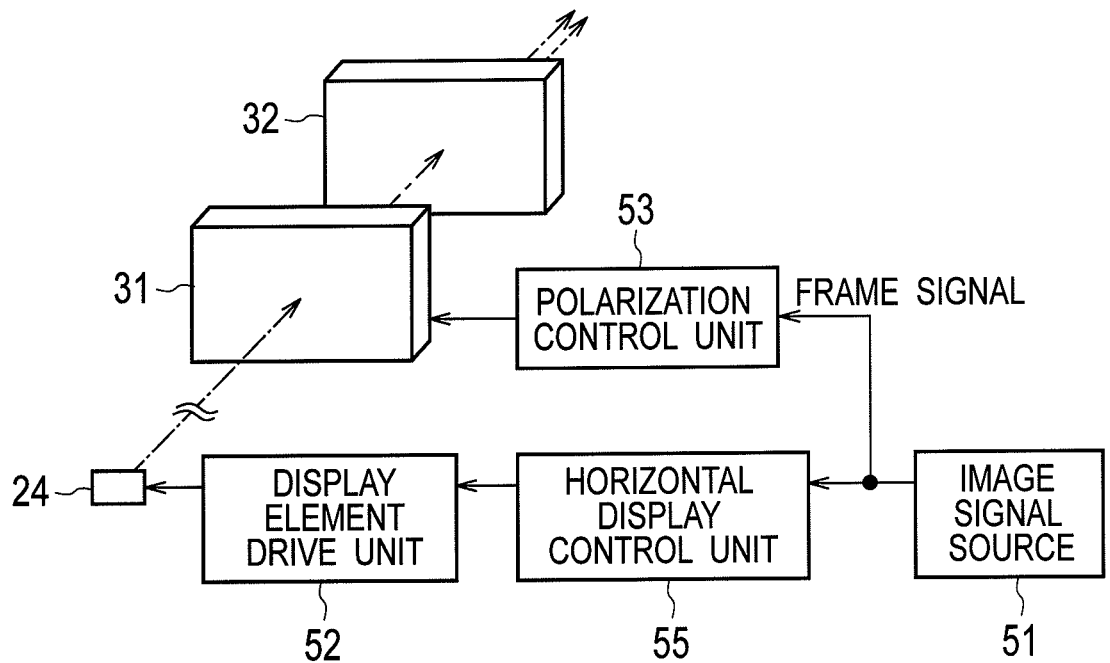
FIG. 2 is a schematic block diagram for explaining a pixel shifting unit provided for the display apparatus according to the first embodiment.
Figure 3:
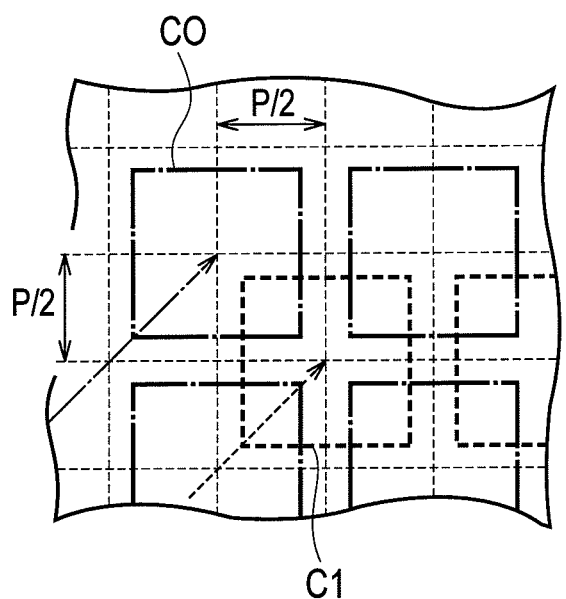
FIG. 3 is a view for explaining the operation of the pixel shifting unit provided for the display apparatus according to the first embodiment.
Figure 4:
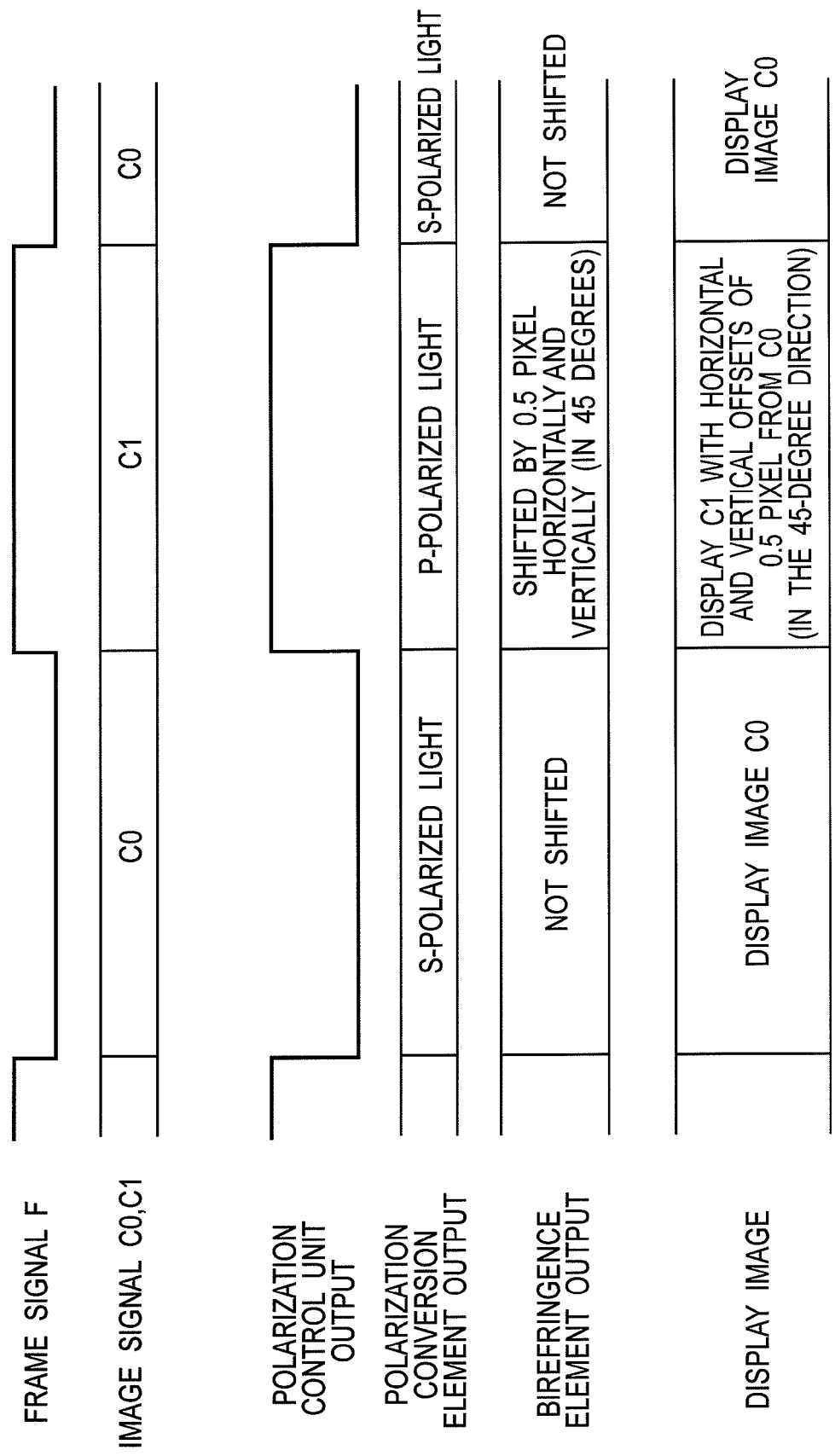
FIG. 4 is a time chart for explaining the operation of the pixel shifting unit provided for the display apparatus according to the first embodiment.

The birefringence element 32 is composed of a crystal plate and the like, for example. As shown in FIG. 2, the birefringence element 32 includes such a crystal axis that the s-polarized light is the ordinary light and the p-polarized light is the extraordinary light, for example. The birefringence element 32 directly transmits s-polarized light while diffracting and outputting p-polarized light. As shown in FIGS. 3 and 4, the birefringence element 32 outputs p-polarized light (dashed line) so that p-polarized light is shifted from s-polarized light (dashed-dotted line) in the 45-degree direction (toward the lower right) by a half pixel, that is, by P/2 (P is a pixel pitch) each in the horizontal and vertical directions.

Accordingly, for example, the pixel shifting unit 3, according to the control by the polarization control unit 53, directly transmits the incident light as s-polarized light when the voltage applied to the polarization conversion element 31 is off and shifts the incident light as p-polarized light with an offset of a ½ pixel each in the horizontal and vertical directions from the s-polarized light when the voltage applied to the polarization conversion element 31 is on.

The projection lens 4 projects the light outputted from the birefringence element 32 of the pixel shifting unit 3 onto the screen to form an image on the screen for display.

Figure 5:
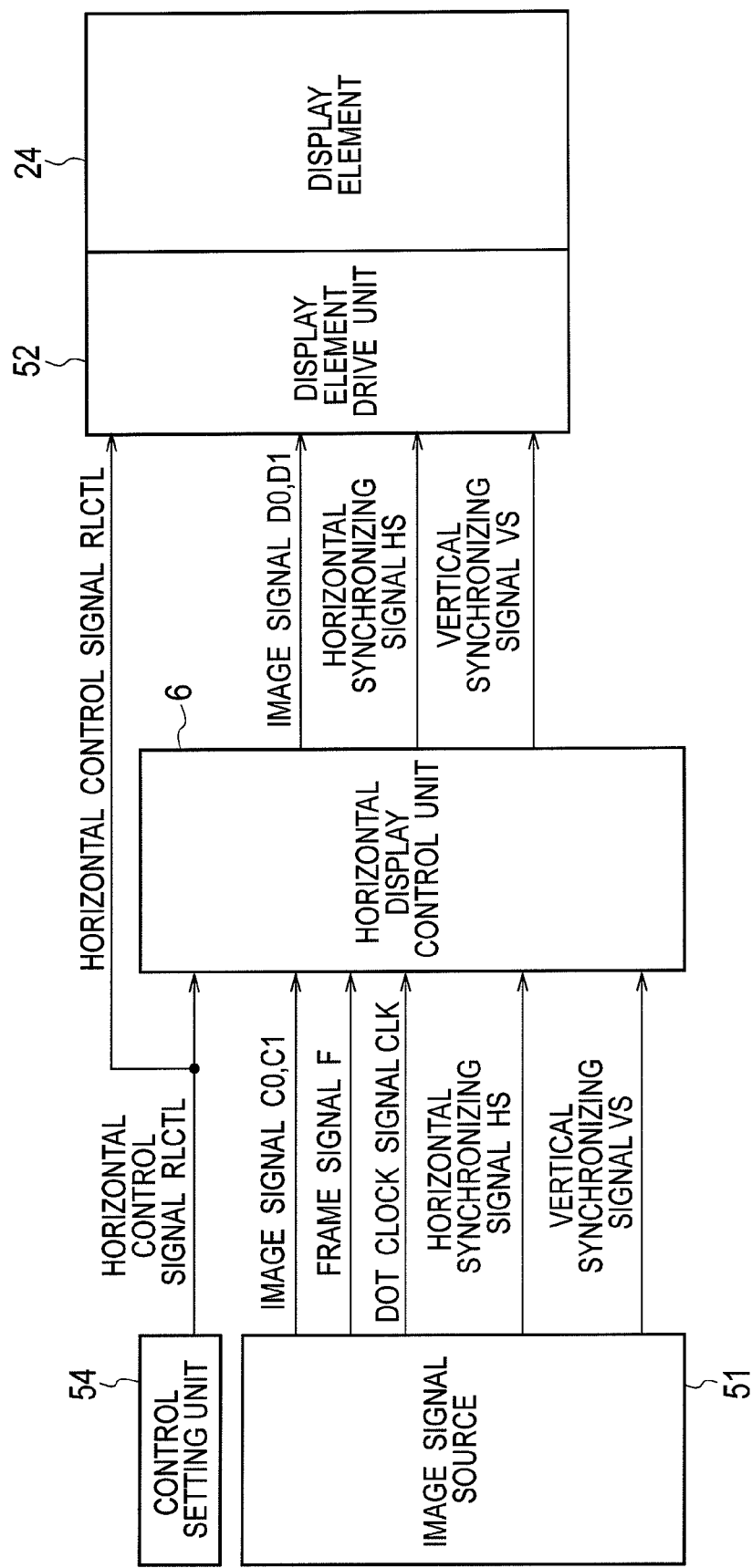
FIG. 5 is a schematic block diagram for explaining the structure of the main part of the display apparatus according to the first embodiment.

As shown in FIG. 5, the image signal source 51 alternately outputs two types of image signals C0(x, y) and C1(x, y) for pixel shifting and display, which are generated from the original high-resolution image signal C(x, y), to the horizontal display control unit 6. The image signals C0 and C1 may be generated by various methods such as: filtering of each pixel and the peripheral pixels thereof; and extracting and assigning pixels corresponding to the individual display positions from the original image. For example, the image signal C0 corresponds to odd frames, and the image signal C1 corresponds to even frames.

The image signals C0 and C1 outputted from the image signal source 51 are signals alternately displayed on a predetermined frame-by-frame basis and each have the same number of pixels as that of the display element 24. The number of pixels of each of the image signals C0 and C1 is set to 2000 pixels horizontally by 1000 pixels vertically when the number of pixels of the original image signal C is 4000 pixels horizontally by 2000 pixels vertically, for example.

The display element drive unit 52 controls the display elements 24R, 24G, and 24B so that the display elements 24R, 24G, and 24B respectively display red, green, and blue components of the image according to the image signal outputted from the image signal source 51. Moreover, the display element drive unit 52 controls the display element 24 according to the control by the control setting unit 53 so that the displayed image is horizontally inverted.

The polarization control unit 53 controls the drive of the polarization conversion element 31 of the pixel shifting unit 3 according to frame signal F of the image signal outputted from the image signal source 51. The polarization control unit 53 controls the polarization conversion element 31 so that each pixel of the image signal C0 is directly displayed when the frame signal F is 0 (low) while each pixel corresponding to the image signal C1 is shifted with respect to the corresponding pixel of the image signal C0 when the frame signal F is 1 (high).

The control setting unit 54 determines the installation position of the display apparatus according to the first embodiment. Moreover, based on the determined installation position, the control setting unit 54 outputs horizontal control signal RLCTL used to horizontally invert an image for projection to the display element drive unit 52 and horizontal display control unit 6. The control setting unit 54 may be provided with a sensor for detecting the installation position in order to determine the installation position according to the output from the sensor, or may be provided with an input unit, such as a switch, to determine the installation position according to the input by the user's operation for the input unit. When the determined installation position is the normal position at which the display apparatus performs front projection, the control setting unit 54 outputs a horizontal control signal RLCTL of 0 (low). When the determined installation position is the position at which the display apparatus performs rear projection, the control setting unit 54 outputs a horizontal control signal RLCTL of 1 (high).

The display element drive unit 52 controls each display element 24 according to the horizontal control signal RLCTL outputted from the control setting unit 54 so that the displayed image is horizontally inverted. The display element 24 horizontally inverts the image and displays the inverted image according to the control by the display element drive unit 52.

The horizontal display control unit 6 changes the received image signal C0 or C1 so that the image corresponding to any one of the image signals C0 and C1 is horizontally shifted by one pixel and outputs the changed signal C0 or C1 to the display element drive unit 52 as the image signal D0 or D1.

Specifically, in the case where the image produced by the image signal C1 is shifted from the image produced by the image signal C0 in the 45-degree direction (toward the lower right) at the normal installation position, the horizontal display control unit 6 changes the signal C0 according to the horizontal control signal RLCTL so that the image produced by the image signal C0 is shifted to the right by one pixel. Alternatively, the horizontal display control unit 6 changes the signal C1 in response to the horizontal control signal RLCTL so that the image produced by the image signal C1 is shifted to the left by one pixel. Thus, the image produced by the image signal C1 is projected with an offset from the image produced by the image signal C0 in the (−45 degree) direction (toward the lower left). Accordingly, when the display element 24 displays an image horizontally inverted for rear projection, the image produced by the image signals C0 and C1 is correctly displayed on the screen.

Figure 6:
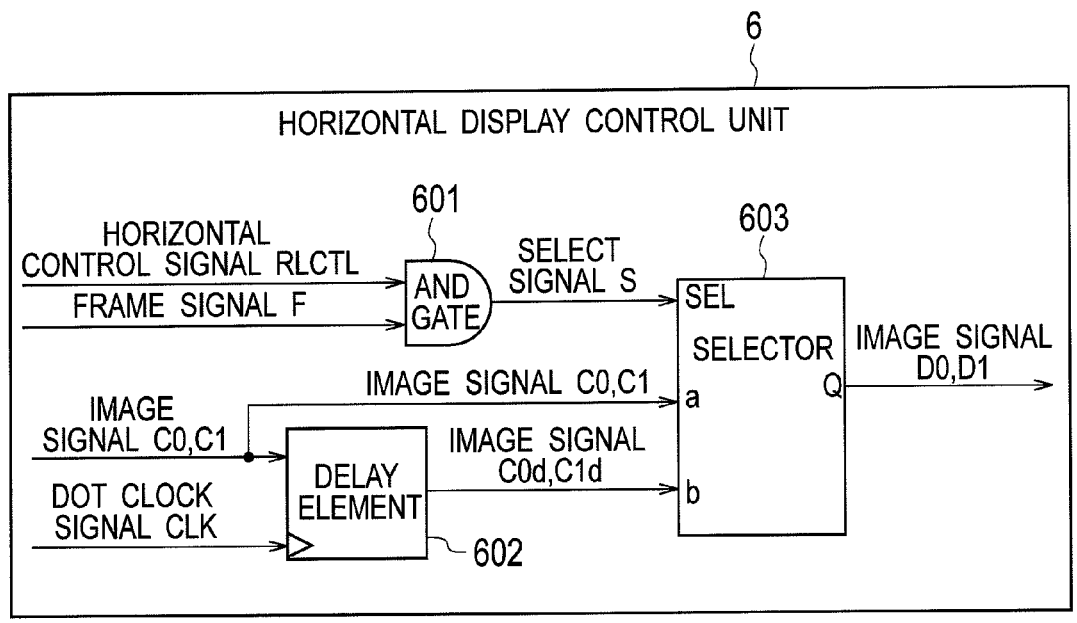
FIG. 6 is a schematic block diagram for explaining a horizontal display control unit provided for the display apparatus according to the first embodiment.

As shown in FIG. 6, for example, the horizontal display control unit 6 includes an AND gate 601, a delay element 602, and a selector 603. The AND gate 601 is a logical gate that receives the horizontal control signal RLCTL outputted from the control setting unit 54 and the frame signal F outputted from the image signal source 51 as input signals and outputs the AND (logical product) of the received input signals as a select signal S. The image signal source 51 outputs the image signal C0 when the frame signal F is 0 (low) and outputs the image signal C1 when the frame signal F is 1 (high).

The delay element 602 receives the image signals C0 and C1 and dot (pixel) clock signal CLK from the image signal source 51 and delays the image signals C0 and C1 by one clock cycle of the dot clock signal CLK to output the delayed signals as image signals C0d and C1d, respectively. The dot clock signal CLK is outputted from the image signal source 51 in synchronization with the image signals C0 and C1 based on the time taken to display one pixel.

The selector 603 includes: a terminal SEL receiving the select signal S; an input port a receiving the image signals C0 and C1; an input port b receiving the image signals C0d and C1d outputted from the delay element 602; and an output port Q. As the image signals D0 and D1, the selector 603 outputs from the output port Q, the signal inputted to the input port a when the select signal S is 0 (low) and outputs from the output port Q, the signal inputted to the input port b when the select signal S is 1 (high).

When the horizontal control signal RLCTL is 0, the select signal S, which is the output of the AND gate 601, is always 0, and the selector 603 then directly outputs the image signal C0 or C1 inputted to the input port a as the image signal D0 or D1. On the other hand, when the horizontal control signal RLCTL is 1, the select signal S, which is the output of the AND gate 601, is equal to the value of the frame signal F. In this case, when the frame signal F is 0, that is, image signal is C0, the selector 603 outputs the not-delayed image signal C0 from the output port Q. When the frame signal F is 1, that is, the image signal is C1, the selector 603 outputs the delayed image signal C1d from the output port Q.

Figure 7:
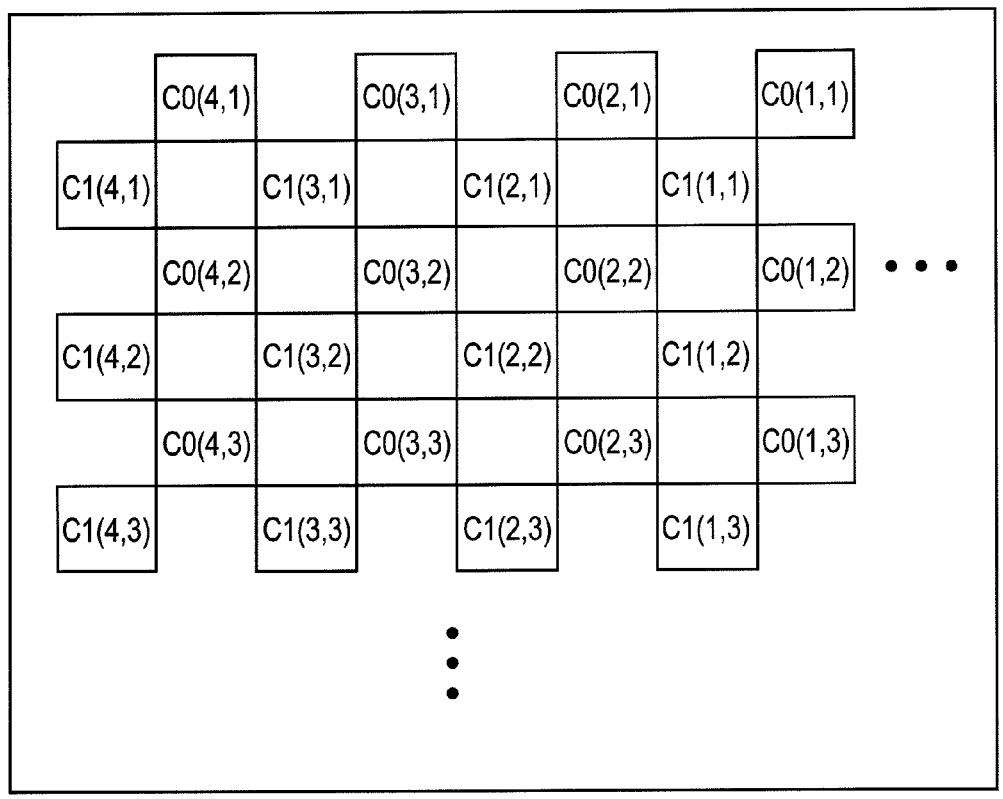
FIG. 7 is a schematic view for explaining an image projected by the display apparatus according to the first embodiment.

When the horizontal control signal RLCTL is 1, the display element drive unit 52 controls the display element 24 so that the displayed image is horizontally inverted. As a result, the display apparatus according to the first embodiment displays an image that can be correctly seen by an observer located in front of the screen as shown in FIG. 7 when the display apparatus performs rear projection.

Modifications of Horizontal Display Control Unit

The horizontal display control unit 6 may control the image signal outputted according to the frame signal F using a dual port, for example. Hereinafter, a description is given of display apparatuses according to first and second modifications of the first embodiment including modifications of the horizontal display control unit 6.

(First Modification)

Figure 8:
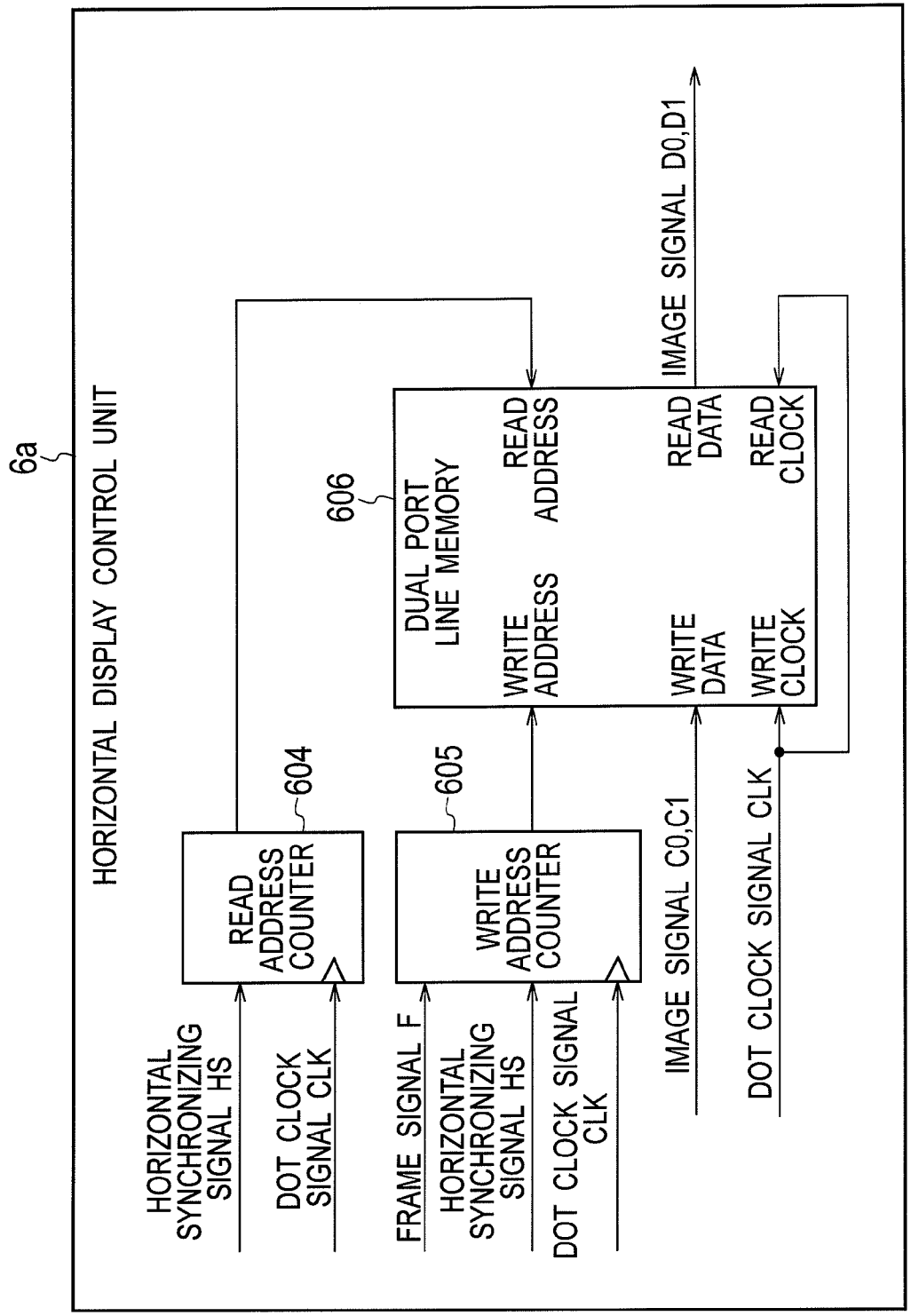
FIG. 8 is a diagram for explaining the horizontal display control unit provided for the display apparatus according to a first modification of the first embodiment.

A horizontal display control unit 6a provided for the display apparatus according to the first modification of the first embodiment includes a read address counter 604, a write address counter 605, and a dual port line memory 606 as shown in FIG. 8.

The read address counter 604 receives a horizontal synchronizing signal HS and the dot clock signal CLK outputted from the image signal source 51. The read address counter 604 increments and outputs the count value at each clock cycle of the dot clock signal CLK and resets the count value at each pulse of the horizontal synchronizing signal HS.

The write address counter 605 receives the frame signal F, horizontal synchronizing signal HS, and dot clock signal CKL outputted from the image signal source 51. The write address counter 605 increments and outputs the count value at each clock cycle of the dot clock signal CLK and resets the count value at each pulse of the horizontal synchronizing signal HS. When resetting the count value in response to the horizontal synchronizing signal HS, the write address counter 605 sets the initial value of the count value to the value of the frame signal F.

The dual port line memory 606 receives the count values outputted from the read and write address counters 604 and 605 as the write and read addresses, respectively. The dual port line memory 606 temporarily stores image signals C0 and C1 cyclically at each clock cycle of the dot clock signal CLK. The dual port line memory 606 receives the dot clock signal CLK as the read clock signal. The dual port line memory 606 outputs the image signal C0 or C1 stored at the received read address at each clock cycle of the dot clock signal CLK as the image signal D0 or D1.

Figure 9:
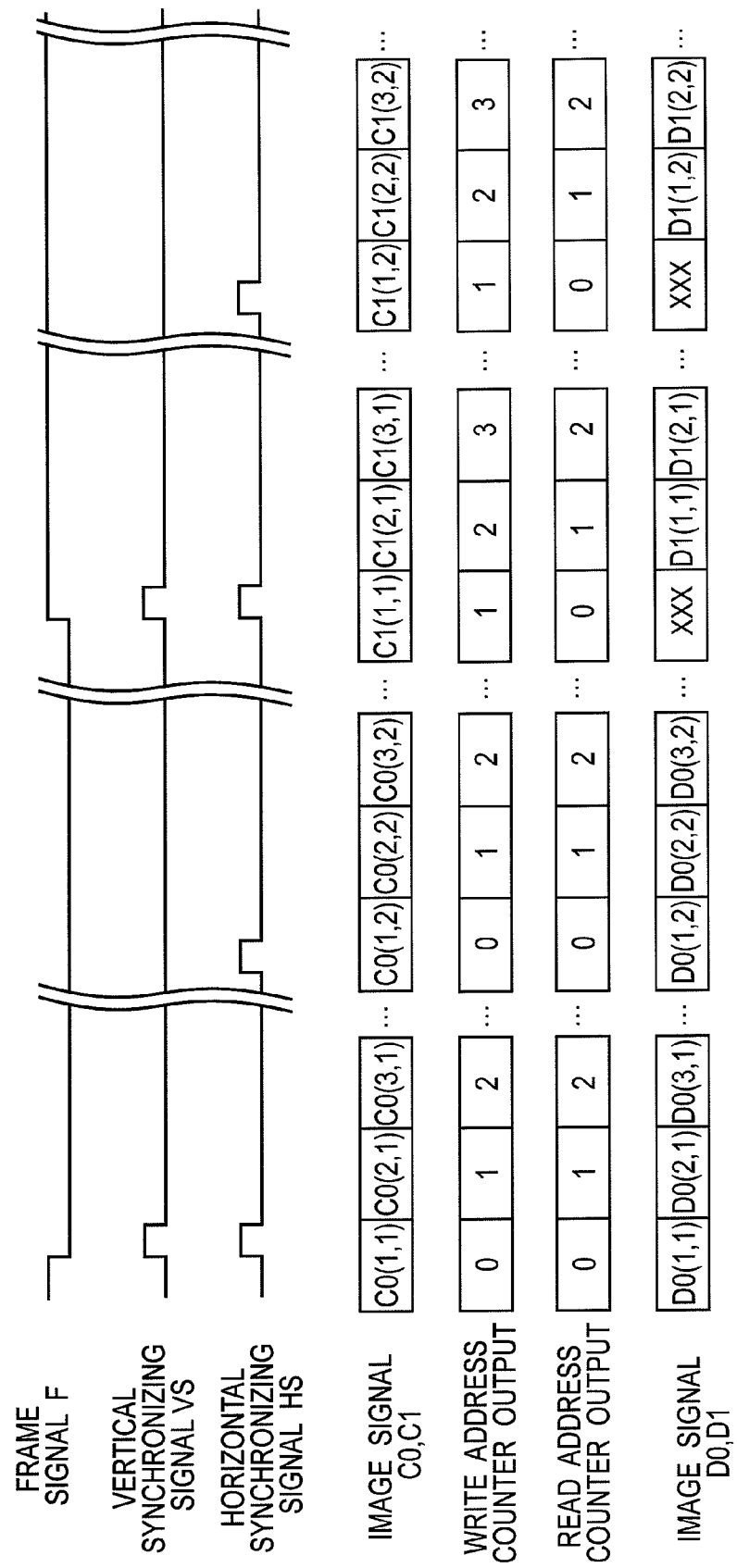
FIG. 9 is a time chart for explaining the operation of the horizontal display control unit provided for the display apparatus according to the first modification of the first embodiment.

As shown in FIG. 9, when the frame signal F is 0, the write address counter 605 resets the count value in response to the horizontal synchronizing signal HS and initializes the same to 0. The address counter 605 then increments and outputs the count value at each clock cycle of the dot clock signal CLK. The read address counter 604 resets the count value according to the horizontal synchronizing signal HS and initializes the count value to 0. The read address counter 604 then increments and outputs the count value at each clock cycle of the dot clock signal CLK. Accordingly, the dual port line memory 606 outputs the inputted image signal C0 as the image signal D0 simultaneously.

When the frame signal F is 1, the write address counter 605 resets the count value in response to the horizontal synchronizing signal HS and initializes the same to 1. The write address counter 605 then increments and outputs the count value at each clock cycle of the dot clock signal CLK. The read address counter 604 resets the count value in response to the horizontal synchronizing signal HS and initializes the count value to 0. The read address counter 604 then increments and outputs the count value at each clock cycle of the dot clock signal CLK. Accordingly, the dual port line memory 606 outputs the inputted image signal C1 as the image signal D1 with a delay of one clock cycle.

Accordingly, in an image projected by the display apparatus according to the first modification of the first embodiment, the image produced by the image signal C1 is shifted from the image produced by the image signal C0 in the −45 degree direction (toward the lower left) as shown in FIG. 7. As a result, the display apparatus according to the first modification displays an image that can be correctly seen by an observer located in front of the screen in the case of rear projection.

(Second Modification)

Figure 10:
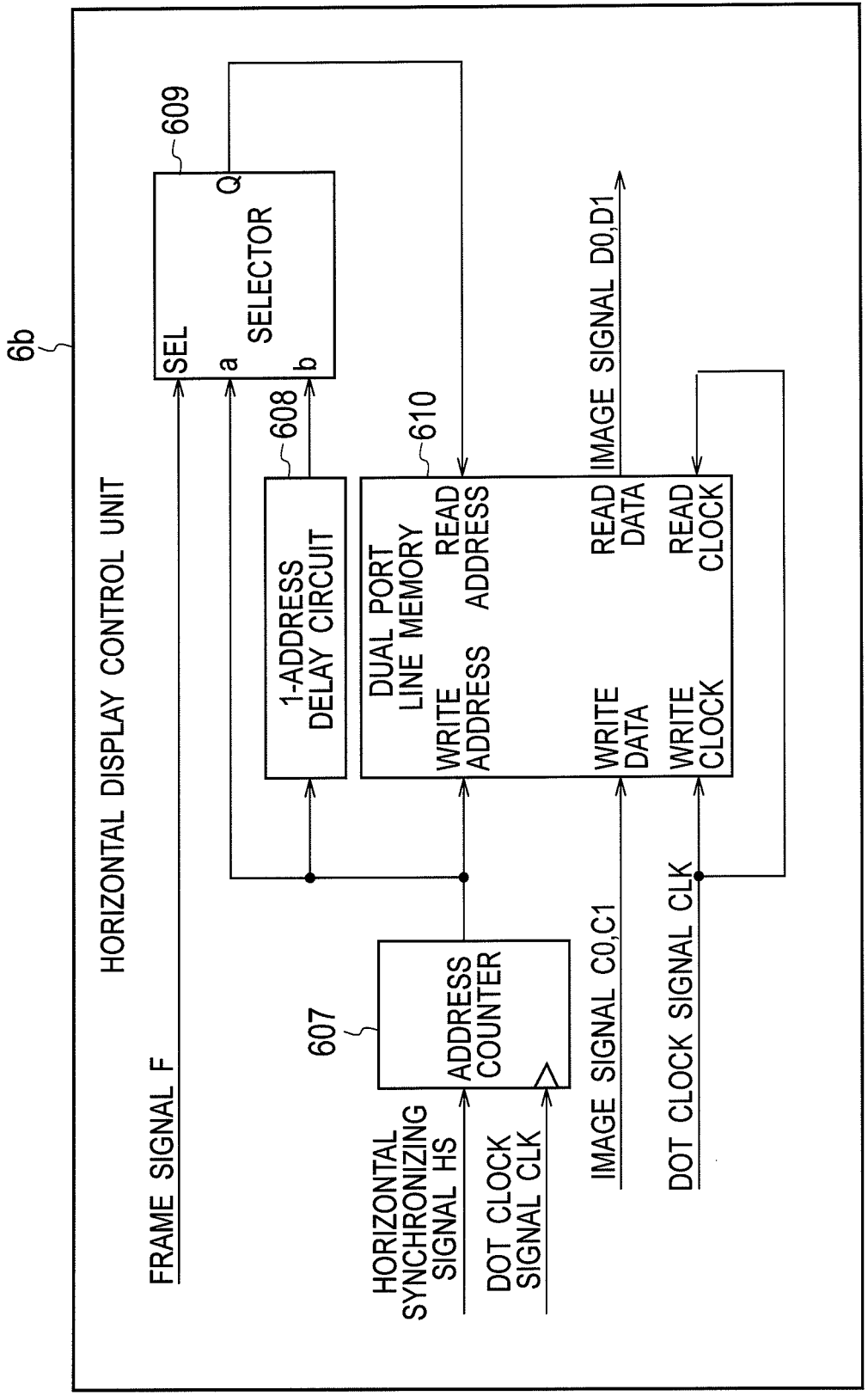
FIG. 10 is a diagram for explaining a horizontal display control unit provided for a display apparatus according to a second modification of the first embodiment.

A horizontal display control unit 6b provided for the display apparatus according to the second modification of the first embodiment includes an address counter 607, a one-address delay circuit 608, a selector 609, and a dual port line memory 610 as shown in FIG. 10.

The address counter 607 receives the horizontal signal HS and dot clock signal CLK outputted from the image signal source 51. The address counter 607 increments the count value at each clock cycle of the dot clock signal CLK and outputs the count value as an address. The address counter 607 resets the count value at each pulse of the horizontal synchronizing signal HS. The one-address delay circuit 608 receives the address outputted from the address counter 607 and delays the same by one address.

The selector 609 includes: a terminal SEL receiving the frame signal F; an input port a receiving the address outputted from the address counter 607; an input port b receiving the delayed address outputted from the one-address delay circuit 608; and an output port Q. When the frame signal F is 0, the selector 609 outputs from the output port Q, the address inputted to the input port a. When the frame signal F is 1, the selector 609 outputs from the output port Q, the delayed address inputted to the input port b.

The dual port line memory 610 receives the count value outputted from the address counter 607 as a write address and receives the address outputted from the output port Q by the selector 609 as a read address. The dual port line memory 610 receives the image signal C0 or C1 as write data and receives the dot clock signal CLK as the write clock signal and temporarily stores the image signal C0 or C1 cyclically at each clock cycle of the dot clock signal CLK at the inputted write address. The dual port line memory 610 receives the dot clock signal CLK as the read clock signal. The dual port line memory 610 outputs the image signal C0 or C1 stored at the received read address as the image signal D0 or D1 at each clock cycle of the dot clock signal CLK.

Figure 11:
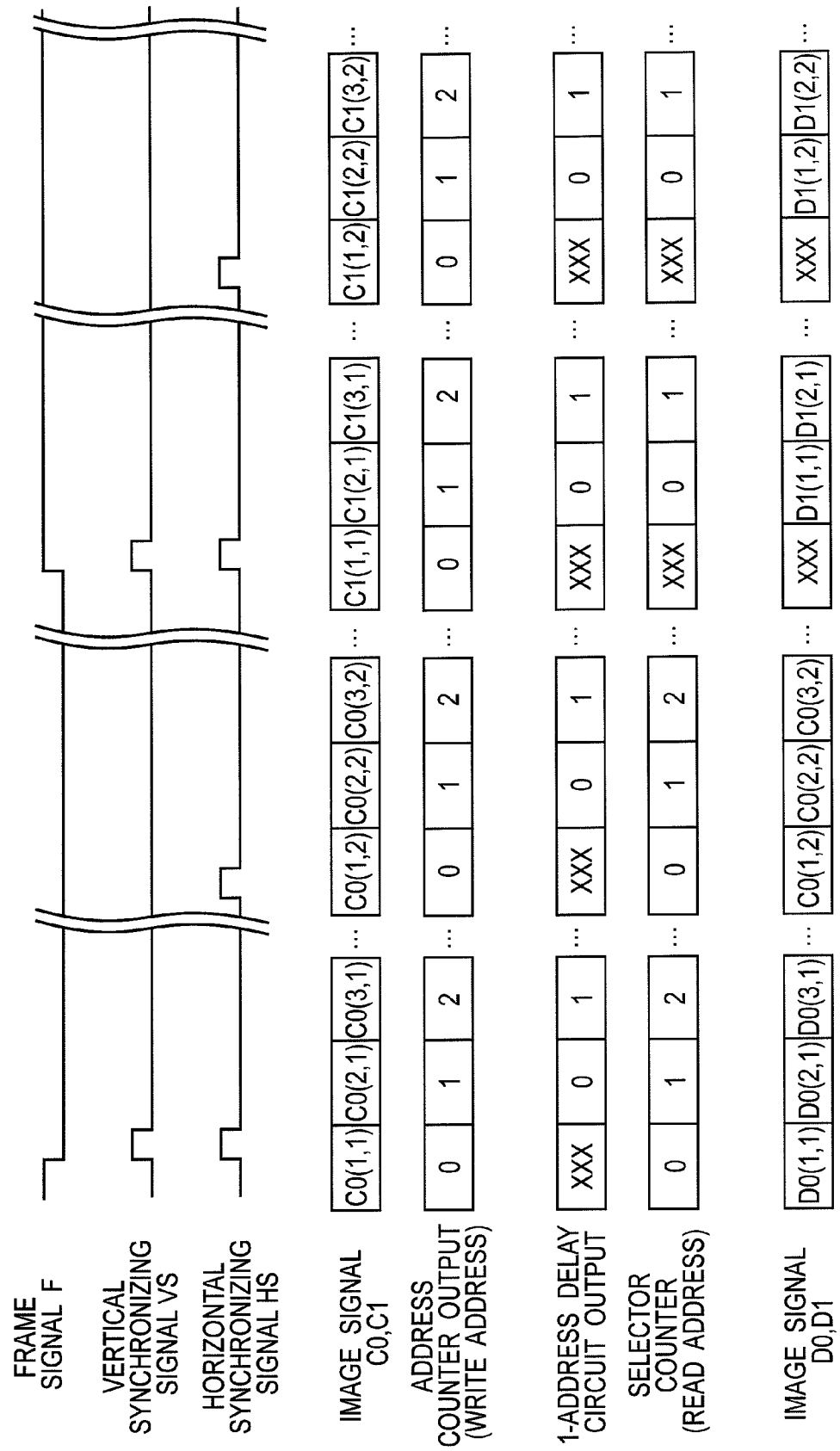
FIG. 11 is a time chart for explaining the operation of the horizontal display control unit provided for the display apparatus according to the second modification of the first embodiment.

When the frame signal F is 0, the dual port line memory 610 receives the address (write address) outputted from the address counter 607, through the output port Q of the selector 609 as the read address as shown in FIG. 11. Accordingly, the dual port line memory 610 simultaneously outputs the inputted image signal C0 as the image signal D0.

When the frame signal F is 1, the dual port line memory 610 receives the delayed address outputted from the one-address delay circuit 608, through the output port Q of the selector 609 as the read address. Accordingly, the dual port line memory 610 outputs the inputted image signal C1 as the image signal D1 with a delay of one clock.

Accordingly, in an image projected by the display apparatus according to the second modification of the first embodiment, the image produced by the image signal C1 is shifted from the image produced by the image signal C0 in the −45 degree direction (toward the lower left) as shown in FIG. 7. As a result, the display apparatus according to the second modification displays an image that can be correctly seen by an observer located in front of the screen in the case of rear projection.

Generally, a display apparatus performing pixel shifting and display generates image signals C0 and C1, which respectively correspond to odd and even frames and each have an equal number of pixels to the display element, from the original high resolution image signal C(x, y) as shown in FIG. 12, for example. The display apparatus can display an image composed of the equivalent number of pixels to that of the original image, which is larger than the number of pixels of each display element, in such a manner that the display element alternately displays the image signals C0 and C1 frame by frame and the birefringence element and the like alternately shift the pixels of the displayed image frame by frame.

Figure 13:
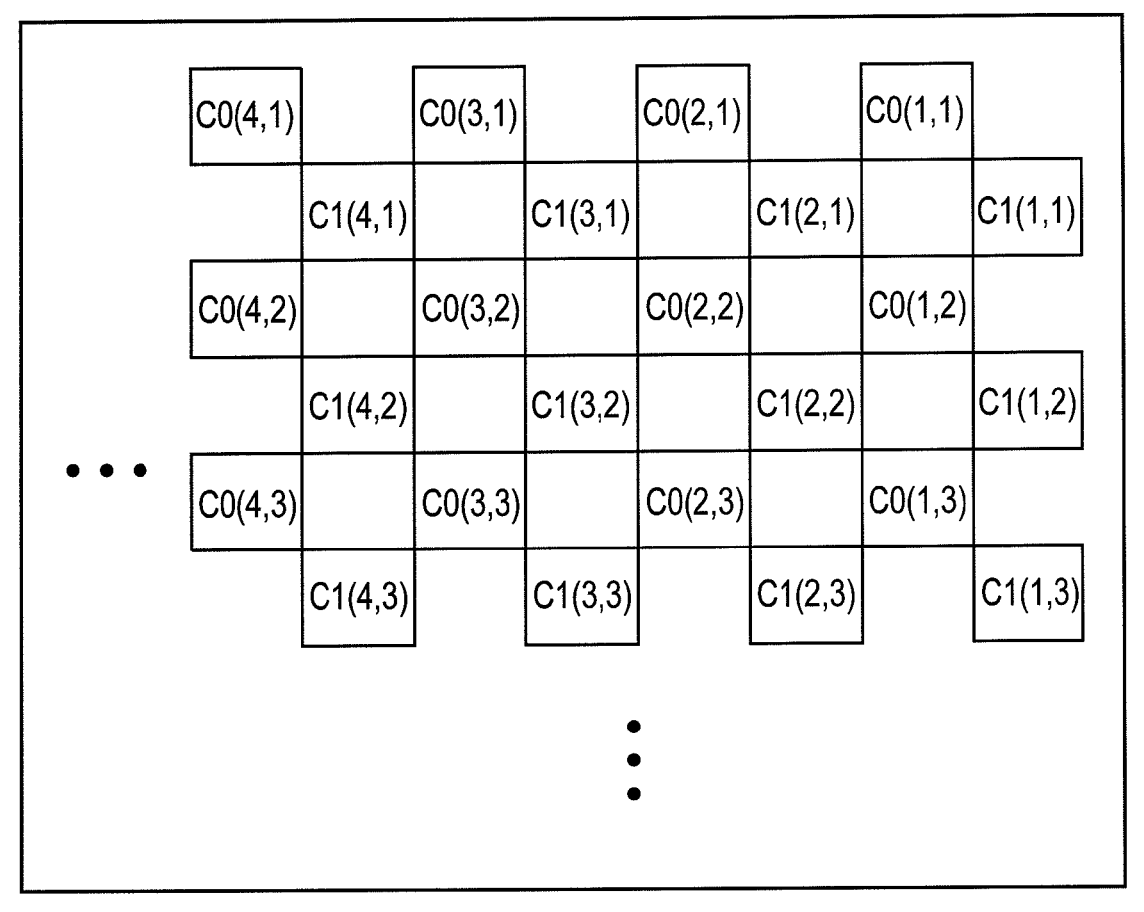

However, in rear projection, the display apparatus cannot project a correct image only by horizontally inverting the image using the display element as shown in FIG. 13. This problem can be solved by rotating the birefringence element. However, this requires the display apparatus to include a rotation mechanism which could increase the size and manufacturing cost thereof.

According to the display apparatus of the first embodiment, it is possible to display a correct image independently of the installation position of the display apparatus using a simple structure without requiring a complicated structure such as a rotation mechanism.

Second Embodiment

The first embodiment describes the display apparatus capable of displaying a correct image even in rear projection. In the second embodiment, a description is given of a display apparatus which additionally includes a simple structure and is capable of performing hanging front projection and hanging rear projection. The hanging front projection is a projection method in which the display apparatus hung upside down projects an image from in front of the screen. The hanging rear projection is a projection method in which the display apparatus hung upside down projects an image from the back of the screen. The other configuration not described in the second embodiment is substantially same as that of the first embodiment, and an overlapping description is omitted.

Figure 14:
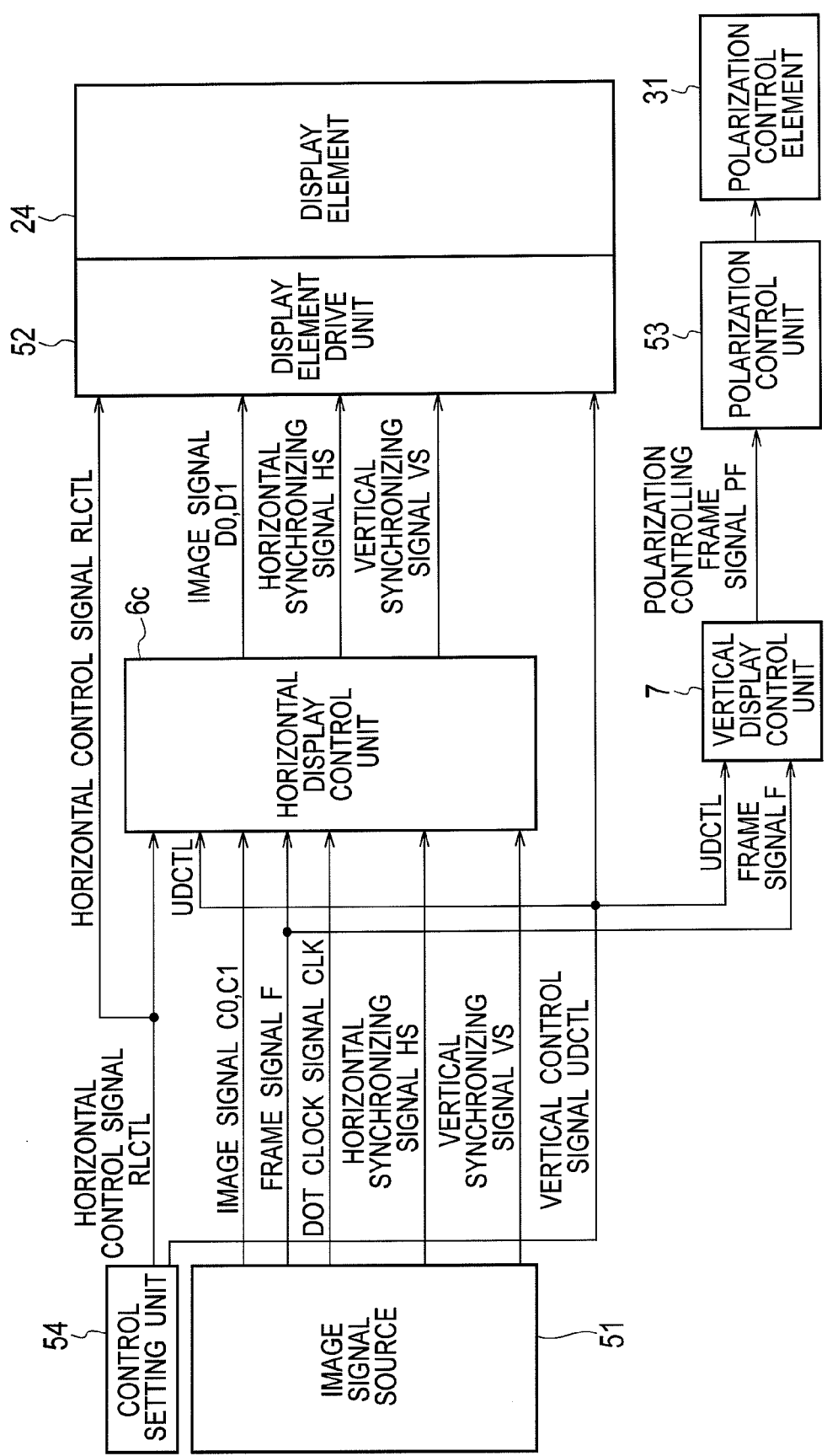
FIG. 14 is a schematic block diagram for explaining the configuration of the main part of a display apparatus according to a second embodiment.

As shown in FIG. 14, the display apparatus according to the second embodiment further includes a vertical display control unit 7 as shown in FIG. 14. The control setting unit 54 outputs a vertical control signal UDCTL in addition to the horizontal control signal RLCTL. The vertical display control unit 7 outputs polarization controlling frame signal PF used to control the drive of the polarization conversion element 31 of the pixel shifting unit 3 in response to the vertical control signal UDCTL outputted from the control setting unit 54 and the frame signal F outputted from the image signal source 51.

The control setting unit 54 outputs the horizontal control signal RLCTL used to horizontally invert a projected image and the vertical control signal UDCTL used to vertically invert a projected image according to the installation position of the display apparatus. The control setting unit 54 outputs the horizontal control signal RLCTL to the display element drive unit 52 and horizontal display control unit 6 and outputs the vertical control signal UDCTL to the display element drive unit 52, a horizontal display control unit 6c, and the vertical display control unit 7.

The control setting unit 54 outputs a horizontal control signal RLCTL of 0 and a vertical control signal UDCTL of 0 when the determined installation position is the normal position. The control setting unit 54 outputs a horizontal control signal RLCTL of 1 and a vertical control signal UDCTL of 0 when the determined installation position is the position for rear projection. The control setting unit 54 outputs a horizontal control signal RLCTL of 1 and a vertical control signal UDCTL of 1 when the determined installation position is the position for hanging front projection. The control setting unit 54 outputs a horizontal control signal RLCTL of 0 and a vertical control signal UDCTL of 1 when the determined installation position is the position for hanging rear projection.

Figure 15:
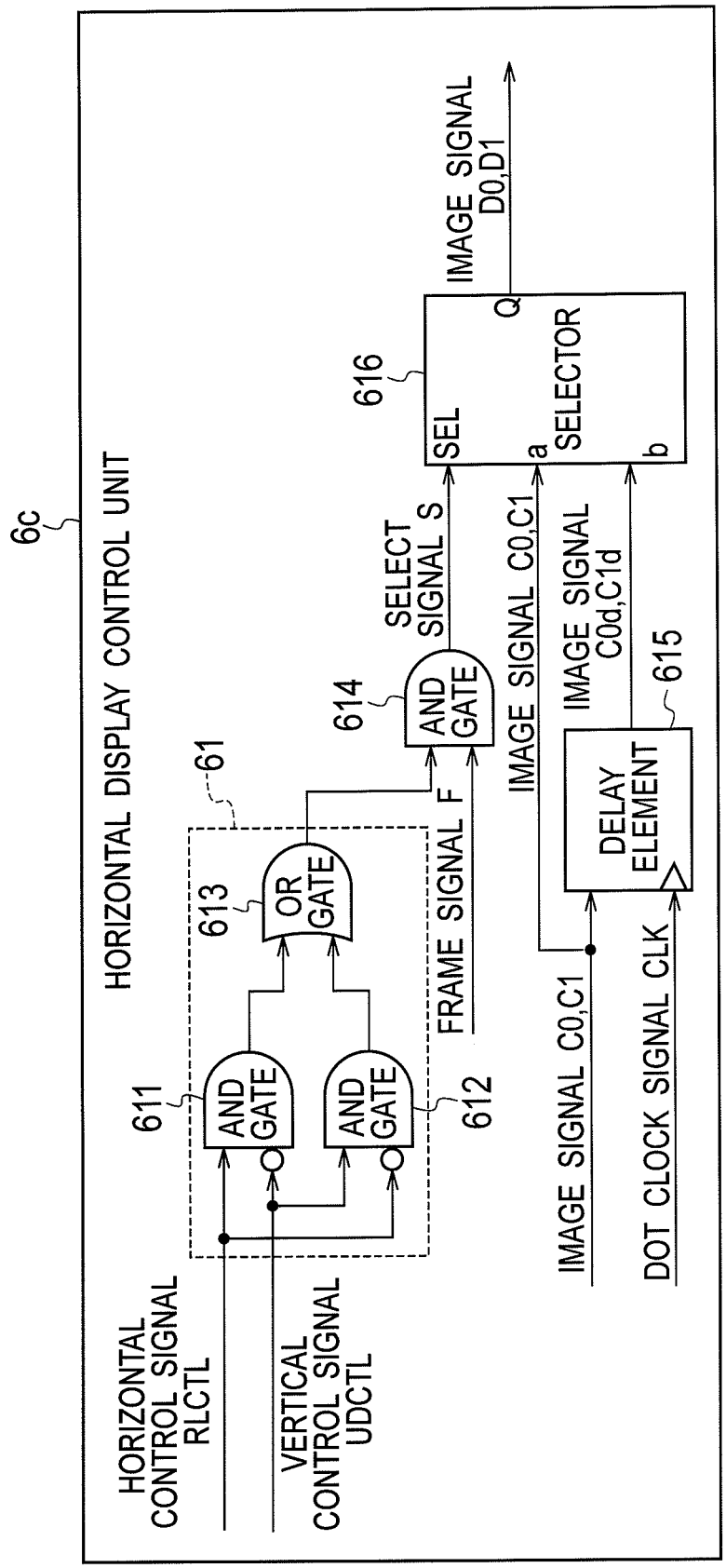
FIG. 15 is a schematic block diagram for explaining a horizontal display control unit provided for the display apparatus according to the second embodiment.

As shown in FIG. 15, the horizontal display control unit 6c provided for the display apparatus according to the second embodiment includes an AND gate 614, a delay element 615, a selector 616, and a gate block 61 for gating the frame signal. F inputted to the AND gate 614.

The gate block 61 includes a first AND gate 611, a second AND gate 612, and an OR gate 613. The first AND gate 611 receives the horizontal control signal RLCTL and the negative (NOT) of the vertical control signal UDCTL as input signals and outputs the AND (logical product) of the received input signals. The second AND gate 612 receives the vertical control signal UDCTL and the negative of the horizontal control signal RLCTL as input signals and outputs the AND of the received input signals. The OR gate 613 receives the output signals from the first and second AND gates 611 and 612 as input signals and outputs the OR of the received input signals as a gate signal.

The AND gate 614 receives the gate signal outputted from the OR gate 613 of the gate block 61 and the frame signal F outputted from the image signal source 51 as the input signals and outputs the AND of the received input signals as a select signal S.

The delay element 615 receives the image signals C0 and C1 and dot clock signal CLK outputted from the image signal source 51 and delays the image signals C0 and C1 by one clock cycle of the dot clock signal CLK so as to output the delayed signals as image signals C0d and C1d. The dot clock signal CLK is outputted from the image signal source 51 based on the time taken to display one pixel.

The selector 616 includes: a terminal SEL receiving the select signal S outputted from the AND gate 614; an input port a receiving the image signals C0 and C1; an input port b receiving the image signals C0d and C1d outputted from the delay element 615; and an output port Q. The selector 616 outputs from the output port Q as the image signal D0 or D1, the output signal inputted to the input port a when the select signal S is 0. The selector 616 outputs from the output port Q as the image signal D0 or D1, the signal inputted to the input port b when the select signal S is 1.

Figure 16:
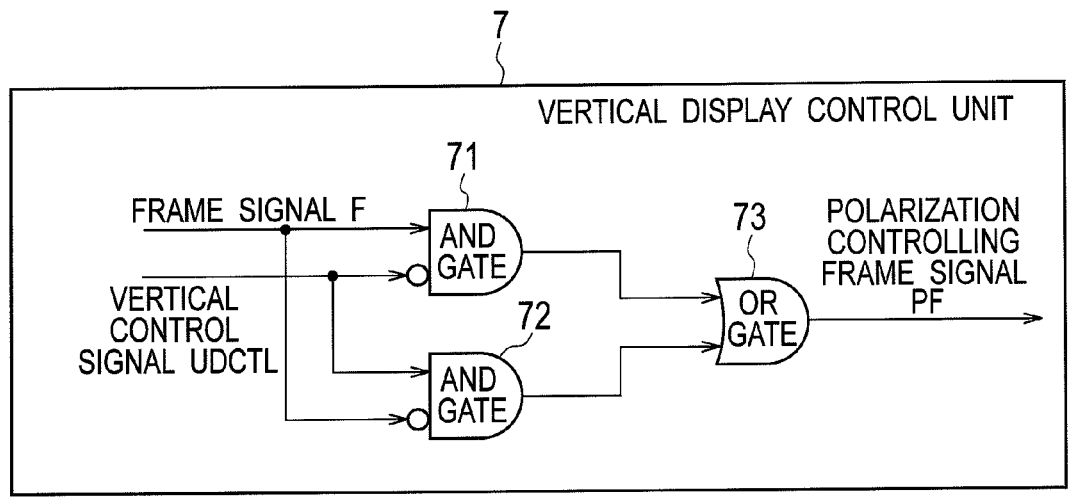
FIG. 16 is a schematic block diagram for explaining a vertical display control unit provided for the display apparatus according to the second embodiment.

The vertical display control unit 7 includes a first AND gate 71, a second AND gate 72, and an OR gate 73 as shown in FIG. 16, for example. The first AND gate 71 receives the frame signal F outputted from the image signal source 51 and the negative (NOT) of the vertical control signal UDCTL outputted from the control setting unit 54 as input signals and outputs the AND of the received input signals. The second AND gate 72 receives the vertical control signal UDCTL outputted from the control setting unit 54 and the negative of the frame signal F outputted from the image signal source 51 as input signals and outputs the AND of the received input signals. The OR gate 73 receives the output signals from the first and second AND gates 71 and 72 as input signals and outputs the OR of the received input signals as the polarization controlling frame signal PF.

When the vertical control signal UDCTL is 0, the output of the first AND gate 71 is the same as the frame signal F, and the output of the second AND gate 72 is always 0. In this case, the OR gate 73 outputs the polarization controlling frame signal PF, which is the same as the frame signal F, to the polarization control unit 53. On the other hand, when the vertical control signal UDCTL is 1, the output of the first AND gate 71 is always 0, and the output of the second AND gate 72 is the negative of the frame signal F. In this case, the OR gate 73 outputs the signal obtained by inverting the frame signal F, to the polarization control unit 53 as the polarization controlling frame signal PF.

The polarization control unit 53 controls the drive of the polarization conversion element 31 of the pixel shifting unit 3 according to the polarization controlling frame signal PF outputted from the vertical display control unit 7. When the polarization controlling frame signal PF is 0, the polarization control unit 53 directly displays pixels of the image. When the polarization controlling frame signal PF is 1, the polarization control unit 53 controls the polarization conversion element 31 so that each pixel of the displayed image is shifted by a ½ pixel in the 45-degree direction with respect to the corresponding pixel displayed when the polarization controlling frame signal PF is 0.

When the horizontal and vertical control signals RLCTL and UDCTL are both 0, that is, when the display apparatus performs front projection, the gate block 61 of the horizontal display control unit 6c outputs a gate signal of 0. In this case, the select signal S outputted from the AND gate 614 is always 0, and the selector 616 outputs the image signal C0 or C1 inputted to the input port a directly as the image signal D0 or D1.

When the horizontal and vertical control signals RLCTL and UDCTL are 1 and 0, respectively, that is, when the display apparatus performs rear projection, the gate block 61 outputs 1 as the gate signal, and the select signal S outputted from the AND gate 614 is the same as the frame signal F. In this case, when the frame signal F is 0, that is, when the image signal is C0, the selector 616 outputs the not-delayed image signal C0 as the image signal D0 from the output port Q. When the frame signal F is 1, that is, when the image signal is C1, the selector 616 outputs the delayed image signal C1d as the image signal D1 from the output port Q.

Moreover, when the horizontal and vertical control signals RLCTL and UDCTL are 1 and 0, respectively, the display element drive unit 52 controls the display element 24 so that the displayed image on the display element 24 is horizontally inverted. As a result, similarly to the first embodiment, the display apparatus according to the second embodiment displays an image that can be correctly seen by an observer located in front of the screen in the case of rear projection.

When the horizontal and vertical control signals RLCTL and UDCTL are both 1, that is, when the display apparatus performs hanging front projection, the gate block 61 outputs a gate signal of 0. In this case, the select signal S outputted from the AND gate 614 is always 0, and the selector 616 outputs the image signal C0 or C1 inputted to the input port a directly as the image signal D0 or D1, respectively.

In the case of hanging front projection, the vertical control signal UDCTL is 1. The vertical display control unit 7 therefore outputs the signal obtained by inverting the frame signal F to the polarization control unit 53 as the polarization controlling frame signal PF. When the frame signal is 1, that is, when the polarization controlling frame signal PF is 0, the polarization control unit 53 directly displays the pixels corresponding to the image signal C1. When the frame signal F is 0, that is, when the polarization controlling frame signal PF is 1, the polarization control unit 53 controls the polarization conversion element 31 so that each pixel corresponding to the image signal C0 is shifted with respect to the corresponding pixel of the image signal C1 by a ½ pixel in the 45-degree direction.

Figure 17:
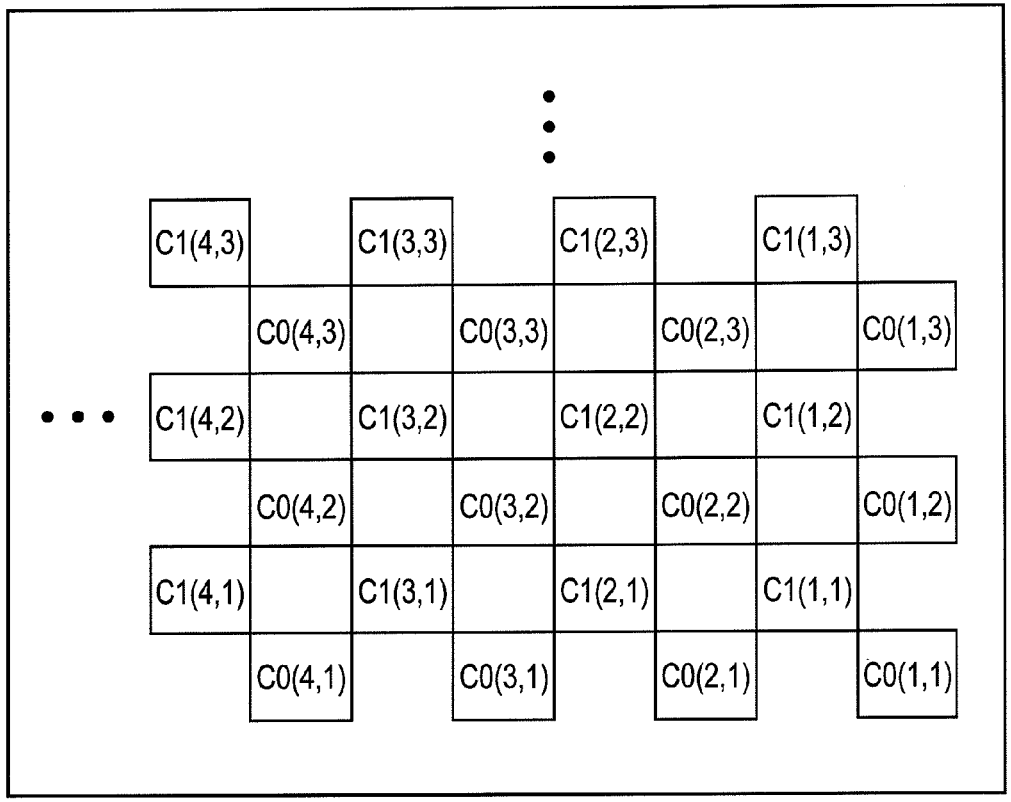
FIG. 17 is a schematic view for explaining an image projected by the display apparatus according to the second embodiment.

Moreover, when the horizontal and vertical control signals RLCTL and UDCTL are both 1, the display element drive unit 52 controls the display element 24 so that the displayed image on the display element 24 is vertically and horizontally inverted. As a result, the display apparatus according to the second embodiment displays an image that can be correctly seen by an observer located in front of the screen as shown in FIG. 17 in the case of the hanging front projection.

When the horizontal and vertical control signals RLCTL and UDCTL are 0 and 1, respectively, that is, when the display apparatus performs hanging rear projection, the gate block 61 outputs a gate signal of 1, and the select signal S outputted from the AND gate 614 is the same as the frame signal F. In this case, when the frame signal F is 0, that is, when the image signal is C0, the selector 616 outputs the not-delayed image signal C0 as the image signal D0 from the output port Q. When the frame signal F is 1, that is, when the image signal is C1, the selector 616 outputs the delayed image signal C1d as the image signal D1 from the output port Q.

In the case of hanging rear projection, the vertical control signal UDCTL is 1. The vertical display control unit 7 therefore outputs the signal obtained by inverting the frame signal F, to the polarization control unit 53 as the polarization controlling frame signal PF. When the frame signal F is 1, that is, when the polarization controlling frame signal PF is 0, the polarization control unit 53 directly displays each pixel corresponding to the image signal C1. When the frame signal F is 0, that is, when the polarization controlling frame signal PF is 1, the polarization control unit 53 controls the polarization conversion element 31 so that each pixel corresponding to the image signal C0 is shifted with respect to the corresponding pixel of the image signal C1 by a ½ pixel in the 45-degree direction.

Moreover, when the horizontal and vertical control signals RLCTL and UDCTL are 0 and 1, respectively, the display element drive unit 52 controls the display element 24 so that the displayed image is vertically inverted. As a result, the display apparatus according to the second embodiment displays an image that can be correctly seen by an observer located in front of the screen as shown in FIG. 18 in the case of the hanging rear projection.

Figures 18, 19:
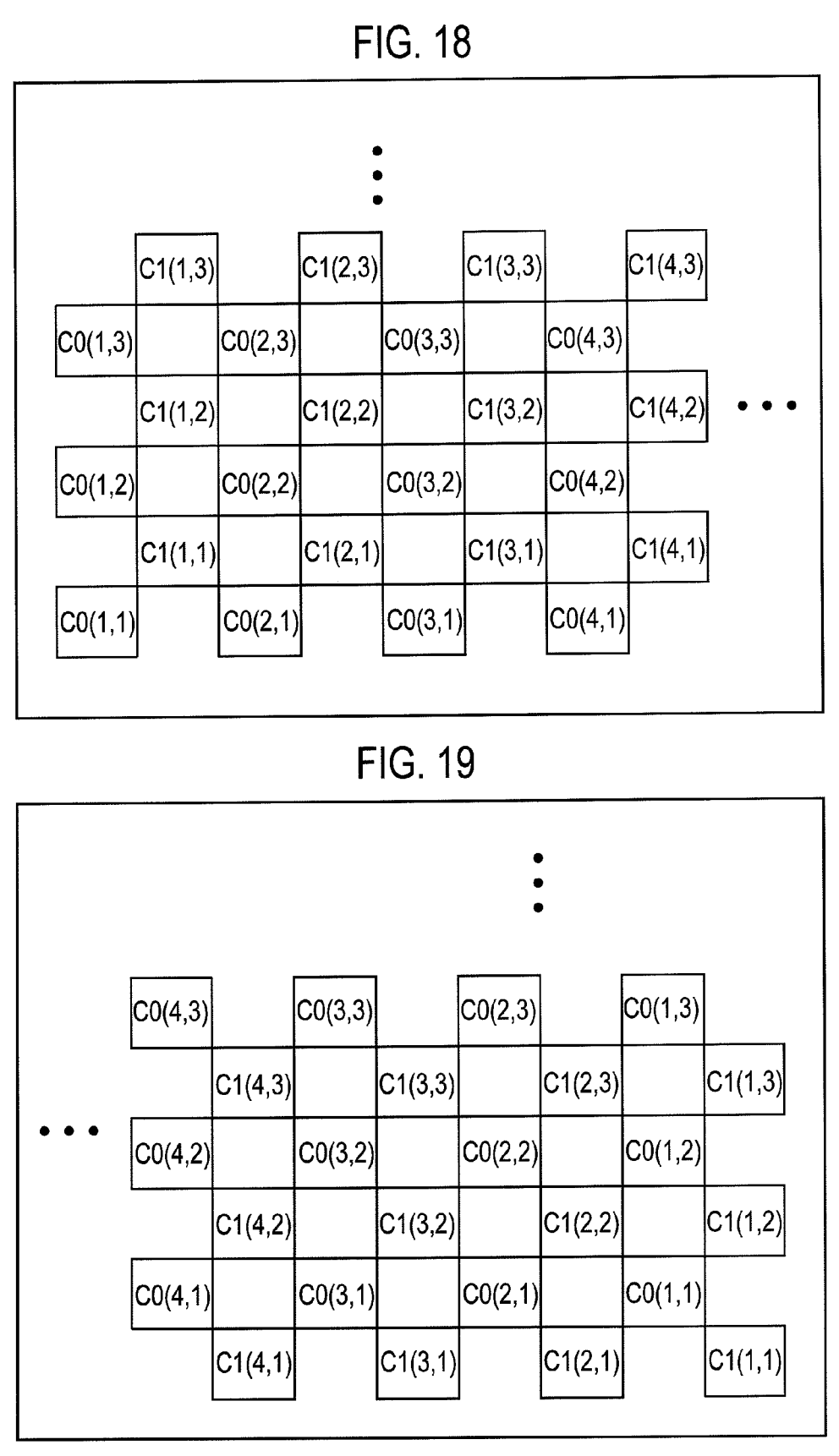
Figure 20:
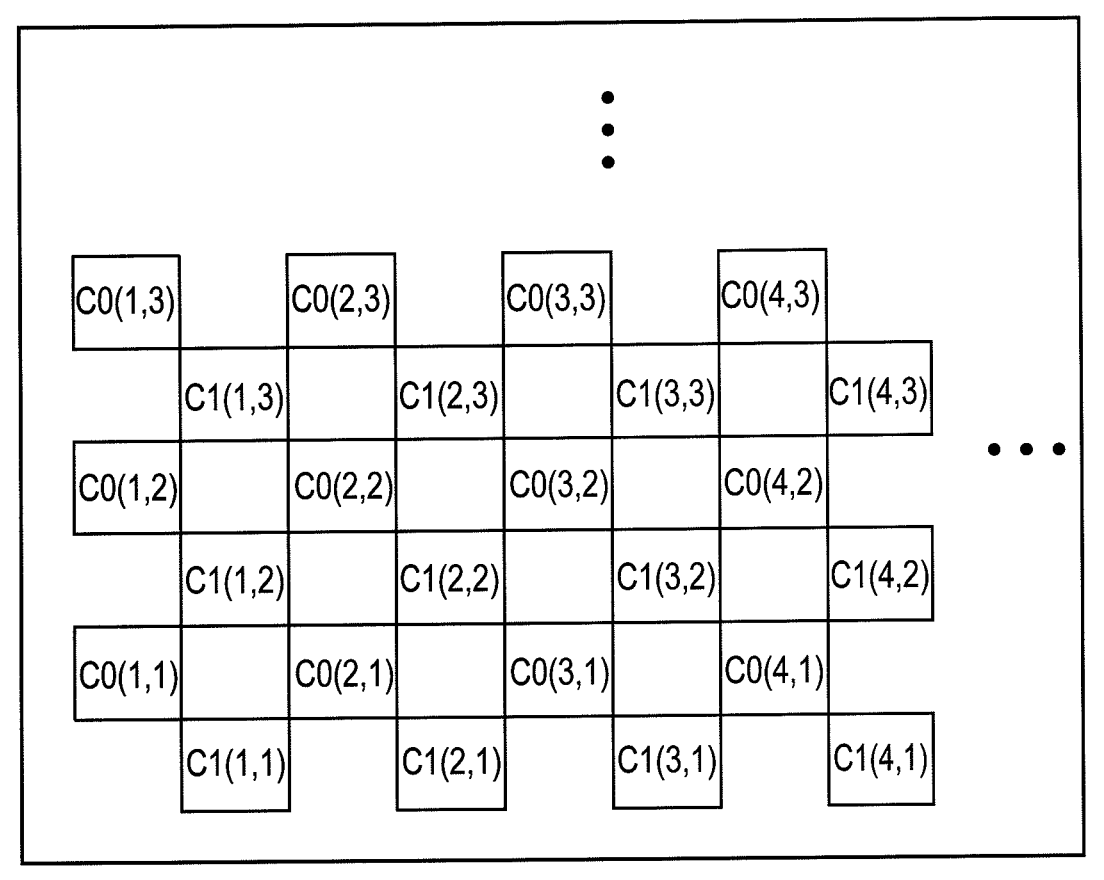

When a general display apparatus performs hanging front projection, a correct image cannot be displayed just by horizontally and vertically inverting the image using the display element as shown in FIG. 19. In a similar manner, when a general display apparatus performs hanging rear projection, a correct image cannot be displayed just by vertically inverting the image using the display element as shown in FIG. 20. These problems can be solved by rotating the birefringence element. However, this requires the display apparatus to include a rotation mechanism which could increase the size and manufacturing cost of the same According to the display apparatus of the second embodiment, it is possible to display a correct image independently of the installation position using a simple structure without requiring a complicated structure such as a rotation mechanism.

Other Embodiments

The embodiments of the present invention are described above, but it should not be understood that the present invention is limited by the description and drawings constituting a part of the disclosure. Those skilled in the art can understand various substitute embodiments, examples, and operation techniques from this disclosure.

In the first and second embodiments described above, the display optical unit 2 includes the display element 24 composed of a reflective liquid crystal light valve. However, the display optical unit 2 may include a display element composed of a transmissive liquid crystal light valve and proper optical elements.

Moreover, in the first and second embodiments described above, the direction that the light emitted from the birefringence element 32 is shifted is not limited to the lower right direction and may be a direction of n×45 degrees (n: an integer). In this case, the operations of the horizontal display control unit 6, vertical display control unit 7, and the other units may be properly changed based on the birefringence element 32.

As described above, it is obvious that the present invention includes various embodiments and the like not described herein. Accordingly, the technical scope of the present invention is defined by the features of the invention according to the claims reasonable from the above description.

What is claimed is:

1. A display apparatus, comprising:
an image signal source alternately outputting two types of image signal on a predetermined frame-by-frame basis;
a display element including a number of pixels corresponding to the image signal outputted from the image signal source;
a control setting unit outputting a horizontal control signal according to an installation position of the display apparatus;
a pixel shifting unit outputting an image as light displayed by the display element—while shifting the light by a distance of a ½ pixel horizontally and a ½ pixel vertically on the predetermined frame-by-frame basis;
a horizontal display control unit receiving the image signal outputted from the image signal source and, in response to the horizontal control signal outputted from the control setting unit, changing the received image signal to shift horizontally by one pixel, an image corresponding to any one of the two types of image signal alternately outputted on the predetermined frame-by-frame basis; and
a display element drive unit receiving the image signal outputted from the horizontal display control unit and, in response to the horizontal control signal outputted from the control setting unit, controlling the display element to cause the display element to display an image obtained by horizontally inverting the image based on the received image signal.

2. The display apparatus according to claim 1, wherein the horizontal display control unit changes the received image signal by delaying the image signal in response to the horizontal control signal outputted from the control setting unit.

3. The display apparatus according to claim 1, wherein the horizontal display control unit includes a dual port memory and changes the received image signal by storing the image signal at an address corresponding to a clock signal synchronized with the image signal in the dual port memory and reading the stored image signal at a later time delayed from the clock signal.

4. The display apparatus according to claim 1, wherein
when the installation position is a hanging position, the control setting unit outputs a vertical synchronizing signal,
in response to the vertical synchronizing signal outputted from the control setting unit, the display element drive unit controls the display element and causes the display element to display an image obtained by vertically inverting the image based on the received image signal, the display apparatus further comprising:
a vertical display control unit, in response to the vertical synchronizing signal outputted from the control setting unit, causing the pixel shifting unit to invert times when the light is alternately shifted and outputted on the predetermined frame-by-frame basis.

5. The display apparatus according to claim 4, wherein the horizontal display control unit outputs the received image signal to the display element drive unit without changing the received image signal when simultaneously receiving the horizontal control signal and vertical control signal outputted from the control setting unit.

6. A display method, comprising the steps of:
alternately outputting two types of image signal on a predetermined frame-by-frame basis;
outputting a horizontal control signal according to an installation position;

outputting an image as light displayed by the display element having a number of pixels corresponding to the image signal while shifting the light by a distance of a ½ pixel horizontally and a ½ pixel vertically on the predetermined frame-by-frame basis;

receiving the image signal and, in response to the horizontal control signal, changing the received image signal to shift horizontally by one pixel, so as to display an image corresponding to any one of the two types of image signal alternately outputted on the predetermined frame-by-frame basis; and receiving the changed image signal and, in response to the horizontal control signal, controlling the display element to cause the display element to display an image obtained by horizontally inverting the image based on the received image signal.

* * * * *